United States Patent
Rainwater et al.

(10) Patent No.: US 7,930,304 B1
(45) Date of Patent: Apr. 19, 2011

(54) METHOD AND SYSTEM FOR AUTOMATED SUBMISSION RATING

(75) Inventors: Michael J. Rainwater, Frisco, TX (US);
Tim B. Doyle, Frisco, TX (US); Aaron D. Richardson, Dallas, TX (US)

(73) Assignee: Intuit Inc., Mountain View, CA (US)

( * ) Notice: Subject to any disclaimer, the term of this patent is extended or adjusted under 35 U.S.C. 154(b) by 297 days.

(21) Appl. No.: 11/854,423

(22) Filed: Sep. 12, 2007

(51) Int. Cl.
*G06F 17/30* (2006.01)
*G06Q 30/00* (2006.01)

(52) U.S. Cl. ........................ 707/748; 705/14.2
(58) Field of Classification Search ............. 707/1–10, 707/100–104.1, 748; 705/10, 14.2
See application file for complete search history.

(56) References Cited

U.S. PATENT DOCUMENTS

| | | | |
|---|---|---|---|
| 2002/0120619 A1* | 8/2002 | Marso et al. | 707/3 |
| 2004/0172267 A1* | 9/2004 | Patel et al. | 705/1 |
| 2007/0143281 A1* | 6/2007 | Smirin et al. | 707/5 |
| 2009/0024605 A1* | 1/2009 | Yang | 707/5 |

* cited by examiner

*Primary Examiner* — Hosain T Alam
*Assistant Examiner* — Navneet K Ahluwalia
(74) *Attorney, Agent, or Firm* — Osha • Liang LLP

(57) ABSTRACT

A method for rating a submission, including receiving the submission from a user, where the submission is associated with a category; obtaining a self-rating and a user contribution level associated with the category, where the self-rating is obtained from the user; determining a submission score for the submission based on the self-rating and the user contribution level; and presenting the submission score for the submission.

22 Claims, 6 Drawing Sheets

| |
|---|
| 200<br>Submission Category |
| 205<br>Self-Rating |
| 210<br>Submission Ratings |
| 215<br>User Contribution Level |
| 220<br>Scoring Weights |
| 225<br>Scoring Scale |
| 230<br>Submission Score |

FIGURE 2

METHOD AND SYSTEM FOR AUTOMATED SUBMISSION RATING

BACKGROUND

A generation of web-based communities and hosted services exist that facilitate collaboration and sharing between users. Examples of such web-based community and hosted service applications include social networks, wikis, weblogs, and folksonomies. Web-based community and hosted service applications typically allow for greater interaction and functionality between users, data, and providers.

Web-based community and hosted service applications are associated with several key principles and characteristics. First, the applications may use the "network as a platform" model, in which applications are accessed by users entirely through a web browser. For example, a web-based word processing utility may allow users to create, edit, update, and delete documents without installing the utility on a personal computer or saving the documents to the personal computer. Second, users of web-based community and hosted service websites or applications often own the data on the website or application and have control over the data. For example, in a photo sharing site, each user can upload images and specify preferences regarding access to the images.

In addition, web-based community and hosted service applications encourage users to add value to the applications by using the applications. Wikis and discussion forums specifically leverage the knowledge and/or opinions of a large number of users to provide services and/or solutions. Web-based community websites also tend to provide an interactive, user-friendly interface with rich Internet applications. Examples of rich Internet applications include virtual desktops within browsers, webmail clients that resemble standalone personal information managers, and web-based office suites.

While value may be added to web applications by facilitating and encouraging user input, unrestricted user access and input may detract from the overall quality, usability, and integrity of web-based community and hosted service applications.

SUMMARY

In general, in one aspect, the invention relates to a method for rating a submission. The method including receiving the submission from a user, where the submission is associated with a category; obtaining a self-rating and a user contribution level associated with the category, where the self-rating is obtained from the user; determining a submission score for the submission based on the self-rating and the user contribution level; and presenting the submission score for the submission.

In general, in one aspect, the invention relates to a user contribution system. The system including a submission repository including a plurality of submissions from a plurality of users; and a scoring module configured to obtain a submission score for each submission of the plurality of submissions based on a self-rating of a user who submitted the submission and a user contribution level of the user, where the self-rating and the user contribution level is based on a category of the submission.

In general, in one aspect, the invention relates to a computer readable medium comprising computer program code to rate a submission under control of a processor. The computer program code including instructions to receive the submission from a user, where the submission is associated with a category; obtain a self-rating and a user contribution level associated with the category, where the self-rating is obtained from the user; determine a submission score for the submission based on the self-rating and the user contribution level; and present the submission score for the submission.

Other aspects of the invention will be apparent from the following description and the appended claims.

BRIEF DESCRIPTION OF DRAWINGS

FIG. 2 shows a diagram of a submission in accordance with one or more embodiments of the invention.

DETAILED DESCRIPTION

Figure 1:
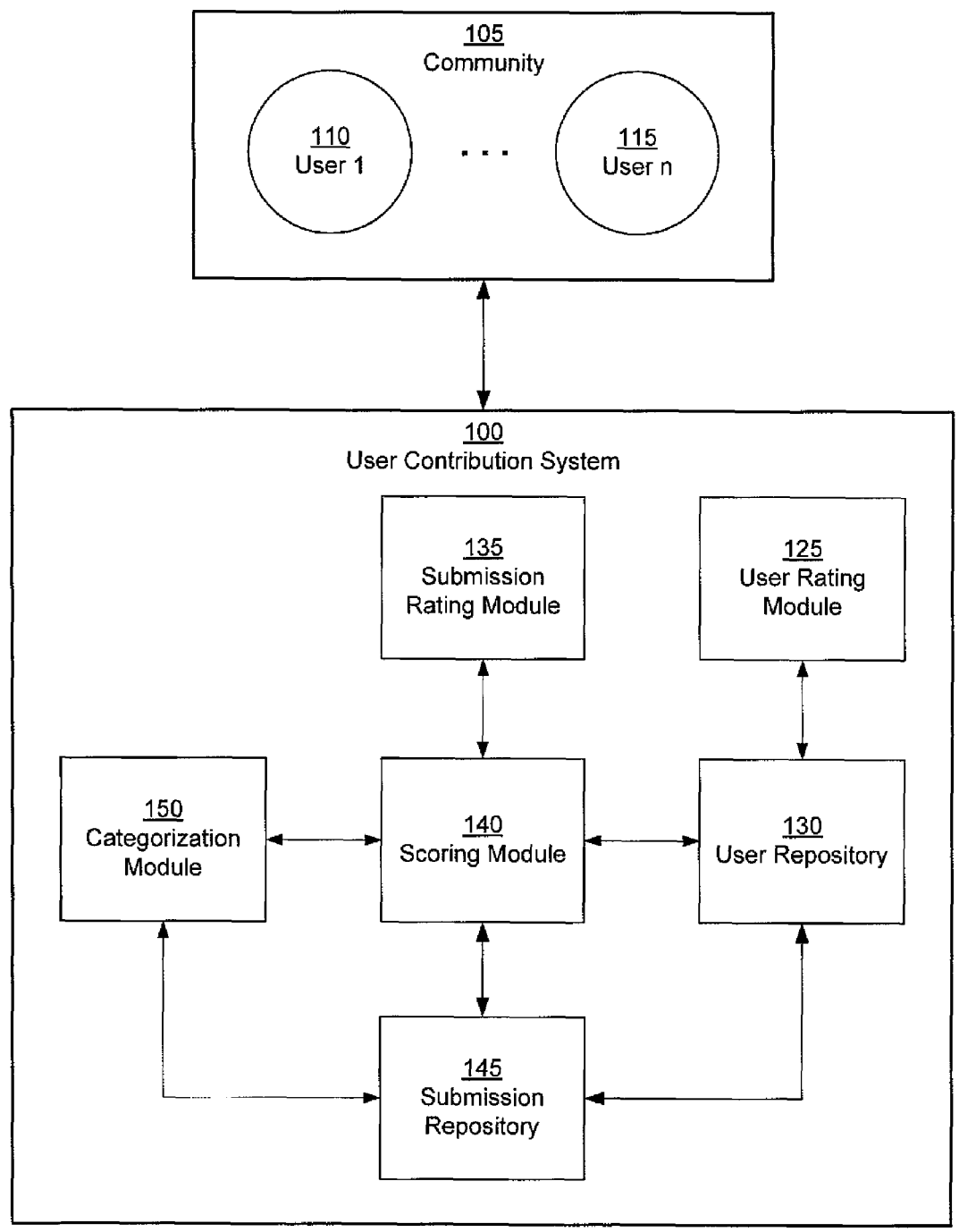
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to rate user submissions to a user contribution system. The user submissions may be made in a user contribution system such as a discussion forum, product review system, or wild. A user submission may be rated using multiple factors, including a self-rating by the user based on the category of the submission, a number of positive and negative submission ratings of the user submission by other users, and a user contribution level in the category of the submission. The final submission score may be determined using scoring weights for each factor and a scoring scale. Embodiments of the invention allow user submissions to be rated automatically when the submissions are received and the ratings to be adjusted automatically as feedback from other users is received.

FIG. 1 shows a schematic diagram of a system in accordance with one or more embodiments of the invention. As shown in FIG. 1, the system includes a user contribution system (100) and a community (105) of users (e.g., user 1 (110), user n (115)). Each of these components is explained below.

The community (105) includes multiple users (e.g., user 1 (110), user n (115)) and may refer to an online community, geographic community, demographic community, and/or other type of community. In one or more embodiments of the invention, the users (e.g., user 1 (110), user n (115)) are associated with a set of user accounts that form a part of the user contribution system (100). Each user account may be associated with a login and password. A user (e.g., user 1 (110), user n (115)) may access the user contribution system (100) by logging in using the login and password of his/her user account.

In one or more embodiments of the invention, the user contribution system (100) is accessed by the users (e.g., user 1 (110), user n (115)) through a user interface (not shown) such as a graphical user interface (GUI). In one or more embodiments of the invention, the user interface includes one or more web pages that can be reached from a computer with a web browser and/or internet connection. In one or more embodiments of the invention, the user interface may be an application that resides on a user computing system (not shown) that communicates with the user contribution system (100) through one or more network connections and protocols. A user computing system may be a personal computer (PC), a mobile phone, a personal digital assistant (PDA), or any other digital computing device.

Those skilled in the art will appreciate that the user interface and the user contribution system (100) may be implemented separately or together. For example, the user interface and the user contribution system (100) may reside on separate servers that communicate with one another using network protocols and/or remote communication methods. Alternatively, the user interface may reside on the same server as the user contribution system (100) and may pass information to one or more components of the user contribution system (100) (e.g., user rating module (125), user repository (130), submission rating module (135), scoring module (140), submission repository (145), categorization module (150)) using local communication methods and/or protocols. As described above, interaction between the users (e.g., user 1 (110), user n (115)) and the user contribution system (100) may be facilitated using a network connection.

In one or more embodiments of the invention, the user contribution system (100) allows users (e.g., user 1 (110), user n (115)) to provide input in the form of submissions. For example, the user contribution system (100) may be an online forum, weblog, wild, social network, and/or other system for facilitating user input, sharing, and/or collaboration. The submissions may include text, images, audio, video, and/or other digital media. The submissions may also be provided for a variety of reasons. For example, in a discussion forum, one user (e.g., user 1 (110), user n (115)) may send a submission to the user contribution system (100) in the form of a question. Another user (e.g., user 1 (110), user n (115)) may then send a submission in the form of an answer to the question. The submissions may also be shared among the users (e.g., user 1 (110), user n (115)). In one or more embodiments of the invention, user submissions are received by the user contribution system (100) and stored in the submission repository (145).

User submissions received by the user contribution system (100) may also be categorized. For example, the user contribution system (100) may implement a restaurant review system. Restaurant reviews submitted by users (e.g., user 1 (110), user n (115)) may be categorized according to type of cuisine (e.g., Thai, Chinese, French, American, or fusion,) or restaurant (e.g., fast food, fine dining, and take out). Categories may be preprogrammed into the user contribution system (100) by an administrator, for example, and categories may also be submitted by the users (e.g., user 1 (110), user n (115)). In one or more embodiments, categories submitted by the users (e.g., user 1 (110), user n (115)) are approved by one or more administrators.

In one or more embodiments of the invention, the categorization module (150) assigns a category to each submission to the user contribution system (100). The category may be determined using a number of methods. For example, the category may be provided and/or selected by the user (e.g., user 1 (110), user n (115)) providing the submission, by a poll of other users, by an administrator, or by algorithmically examining and/or processing the content of the submission (e.g., keyword search and/or word matching, image processing, and/or speech recognition). The category assigned to the submission may be stored in the submission repository (145) along with the submission, or the category may be stored in a separate repository and cross-referenced with the submission in the submission repository (145).

Further, the user contribution system (100) may provide mechanisms for rating submissions by the users (e.g., user 1 (110), user n (115)). Particularly, the user contribution system (100) may provide submission scores for submissions based on a variety of criteria, such as relevance, usefulness, accuracy, and/or entertainment value. In one or more embodiments of the invention, submission scores are overall ratings for submissions based on the criteria above. For example, the user contribution system (100) may include a forum that allows users (e.g., user 1 (110), user n (115)) to ask questions as well as answer questions by other users. Submission scores for the questions may be determined based on relevance and/or usefulness, whereas submission scores for the answers may be based on accuracy, relevance, and/or usefulness. In one or more embodiments of the invention, questions may not be rated, while answers to the questions may be rated based on the ability of the answers to provide solutions to the questions.

In one or more embodiments of the invention, submission scores are determined by obtaining multiple factors associated with the submission, applying a weight to each of the factors, and applying the result to a scale. In one or more embodiments of the invention, weights applied to each factor may be modified as the algorithm is adjusted over time (i.e., dynamically). The factors may be obtained from the user (e.g., user 1 (110), user n (115)) providing the submission, other users, and/or outside sources. In one or more embodiments of the invention, submission scores are determined using the scoring module (140), which obtains the factors and applies the factors to one or more formulas. Factors affecting submission scores are explained in detail below.

In one or more embodiments of the invention, information about the users (e.g., user 1 (110), user n (115)) is stored in the user repository (130). The user information may include a first name, last name, address, email address, and/or other data related to the user contribution system (100). The user information may also include user-provided self-ratings for one or more categories in the user contribution system (100).

In one or more embodiments of the invention, the user-provided self-ratings are personal perceptions of levels of expertise, experience, and/or understanding for the categories in the user contribution system (100). In one or more embodiments of the invention, user-provided self-ratings for categories in the user contribution system (100) are obtained using the user rating module (125) and stored in the user repository (130). The user rating module (125) may include an interface for allowing users (e.g., user 1 (110), user n (115)) to select self-ratings for each category in the user contribution system (100). In one or more embodiments of the invention, the user rating module (125) may collect self-ratings provided by users (e.g., user 1 (110), user n (115)) using other methods, such as email, postal mail, automatic voice recognition, and/or other communication mechanisms.

In one or more embodiments of the invention, a user (e.g., user 1 (110), user n (115)) may specify a self-rating as a scaled numerical value. For example, the user contribution system (100) may include three categories: math, science, and writing. Each user (e.g., user 1 (110), user n (115)) may provide a self-rating of a numerical value from 1 to 10 in each category, in which 10 corresponds to an high level of expertise or understanding, 5 indicates a moderate level of expertise, and 1 corresponds to a low level of expertise. A user (e.g., user 1 (110), user n (115)) who is an expert at math, above average in science, and below average in writing may provide self-ratings of 9, 6, and 3 for math, science, and writing, respectively. Those skilled in the art will appreciate that the self-ratings provided by users (e.g., user 1 (110), user n (115)) may be represented using other scales and means. For example, the self-rating may be represented using a letter score such as A+, B−, C, and D, with A being a high rating and D being a low rating.

In one or more embodiments of the invention, submission scores for submissions by a user (e.g., user 1 (110), user n (115)) in a particular category are influenced by the self-rating provided by the user (e.g., user 1 (110), user n (115)) for that category. In other words, the user's (e.g., user 1 (110), user n (115)) self-rating for the category is a factor in determining submission scores for the user's submissions in that category. As with other factors, the self-rating may be associated with a weight that determines the extent to which the submission score is affected by the self-rating. The weights may be stored in one or more formulas used by the scoring module (140) to calculate the submission score.

Other users may also provide submission ratings for the submission using the submission rating module (135). These submission ratings are then used by the scoring module (140) in calculating the submission score. In one or more embodiments, the submission rating of the submission may be based on the opinions of the other users with respect to criteria such as usefulness, relevance, accuracy, entertainment value, and/or quality. More specifically, other users may provide a scaled rating (e.g., 1-10) for each of the rating criteria. Those skilled in the art will appreciate that the submission rating module (135) may use the same scale as the user rating module (125) or a different scale for obtaining the submission ratings. Further, those skilled in the art will appreciate that the submission ratings provided by other users may be represented using other scales and means. For example, a submission rating may be provided by other users by selecting "agree" or "disagree" or by selecting from a range of agreement such as "completely disagree," "mostly disagree," "disagree," "neutral," "agree," "mostly agree," and "completely agree."

In one or more embodiments of the invention, the scoring module (140) may tally the submission ratings for a submission and determine a statistical mean, median, and/or other value. The statistical value may then be used to influence the submission score for the submission. For example, a submission may be associated with 75 submission ratings of "agree" and 25 submission ratings of "disagree." The scoring module (140) may calculate the submission score using a value such as an average degree of confidence in the submission on a scale of 0 to 1 (e.g., ¾ or 0.75), a median submission rating (i.e., "agree"), and/or a difference in the number of "agree" and "disagree" submission ratings (i.e., 50). The scoring module (140) may also apply other criteria, such as the percentage of "agree" and "disagree" submission ratings in other submissions and/or the number of submission ratings, to the calculation of the statistical value corresponding to the submission ratings.

Finally, a submission score for a particular submission may be affected by the number and/or frequency of submissions (i.e., user contribution level) in the category of the submission by the user (e.g., user 1 (110), user n (115)). The user contribution level may be absolute or relative. In other words, the user contribution level may be determined by obtaining the number and/or frequency of submissions by the user (e.g., user 1 (110), user n (115)) in the category, or by comparing the number and/or frequency of submissions by the user to the number and/or frequency of submissions by one or more other users in the category.

FIG. 2 shows a submission in accordance with one or more embodiments of the invention. Specifically, FIG. 2 shows a number of elements associated with a submission in accordance with one or more embodiments of the invention. As mentioned above, the submission may be in a variety of formats, including text, audio, video, and/or images. Further, the submission may be associated with one of many purposes, including posting a question, answering a question, editing an article, sharing media, providing an opinion or review, and/or other functions associated with a user contribution system, such as the user contribution system of FIG. 1. As shown in FIG. 2, the submission includes a submission category (200), a self-rating (205), one or more submission ratings (210), a user contribution level (215), a number of scoring weights (220), a scoring scale (225), and a submission score (230).

The submission category (200) is a category of the submission, as described above with respect to FIG. 1. For example, a submission in a photo sharing application may be in a category such as landscape, portrait, action, still, underwater, night, and/or other categories associated with types of photography. The self-rating (205) refers to the user's opinion of his/her level of knowledge, expertise, and/or experience in the submission category (200). The self-ratings (205) may be based on a numerical scale (e.g., 1 to 10), a letter scale (e.g., A, B, C, D, F, etc.), and/or any other relevant scale.

The submission may also include one or more submission ratings (210) from other users. The submission ratings (210) represent the other users' opinions of the submission with respect to the submission's relevance, quality, usefulness, accuracy, entertainment value, and/or other criteria. For example, an image on a photo sharing application may include submission ratings based on the image's subject matter, aesthetic qualities, level of detail, composition, and/or other criteria related to the image. As with the self-rating (205), the submission ratings (210) may be obtained using various scales, such as "agree" or "disagree", numerical scales, letter scales, and/or a combination of scales. The submission ratings (210) may also be separated into positive submission ratings and negative submission ratings, as explained below with respect to FIG. 3.

The user contribution level (215) corresponds to the number and/or frequency of submissions in the submission category (200) by the user. The user contribution level (215) may be determined by obtaining the number of submissions in the submission category (200) by the user, by obtaining and/or analyzing one or more time intervals between submissions in the submission category (200) by the user, and/or by examining other aspects of the user's submission patterns.

The scoring weights (220) are weights applied to the self-rating (205), submission ratings (210), and/or user contribution level (215). Specifically, the scoring weights (220) determine the amount of influence each of the self-rating (205), submission ratings (210), and user contribution level (215) has on the submission score (230). The scoring weights (220) may also be affected by the submission category (200) in that scoring weights (220) may differ based on the submission category (200) of the submission. For example, in a photo sharing application, a submission category (200) of portraits may include scoring weights (220) of 0.2 for self-rating, 0.4 for submission ratings (210), and 0.4 for user contribution level (215), whereas a submission category (200) of landscapes may include scoring weights (220) of 0.1 for self-rating, 0.7 for submission ratings (210), and 0.2 for user contribution level (215). Those skilled in the art will appreciate that the scoring weights (220) may differ based on the nature of the submission, the number of users, the number of submissions by each user, and/or other criteria.

The scoring scale (225) determines the distribution of values in the submission score (230). As with the self-rating (205) and submission ratings (210), the scoring scale (225) may be represented using a numerical scale (e.g., 1 to 10), letter scale (e.g., A through F), and/or other scale (e.g., poor, fair, good, and excellent).

The submission score (230) is the overall score of the submission. The submission score (230) is obtained by applying the scoring weights (220) to the self-rating (205), submission ratings (210), and user contribution level (215) and fitting the result to the scoring scale (225).

As an example, a photo sharing application may include an image submitted by a user in the submission category (200) of landscapes. The user's self-rating (205) in the submission category (200) may be a 7 on a scale of 1 to 10. The image may also receive submission ratings (210) from other users averaging 6.5 on a scale of 1 to 10. The user may also have a user contribution level (215) of 20 images in the landscape submission category (200), compared with an average of 50 images by other users in the landscape submission category (200). Additionally, in the landscape submission category (200), the scoring weights (220) may be 0.1 for self-rating, 0.7 for submission ratings (210), and 0.2 for user contribution level (215). Finally, the scoring scale (225) may be a numerical range from 1 to 10.

By multiplying the self-rating (205) of 7 by 0.1, the average submission rating (210) of 6.5 by 0.7, and the user contribution level (215) of 20/50 by 0.2, a value of 5.33 is obtained. Since the value already lies on the scoring scale (225) of 1 to 10, no additional operations may be required to obtain the submission score (230). On the other hand, the value may be rounded up or down, multiplied by a scaling factor, increased or decreased by a shifting factor, and/or changed by applying other numerical adjustments.

The submission score (230) may then be used to help other users assess the quality and/or usefulness of the submission. For example, the submission score (230) may be used to filter the submission if the submission score (230) is below a certain threshold, which may be specified by another user, by an administrator, by an algorithm, and/or using other methods. The submission score (230) may also be used to block and/or recognize the user who provided the submission. For example, if the user's submissions typically receive high submission scores, the user may be recognized with a title and/or award in the submission category (200). On the other hand, if the user's submissions overwhelmingly receive low submission scores, the user and/or the user's submissions may be blocked from the user contribution system.

Figure 3:
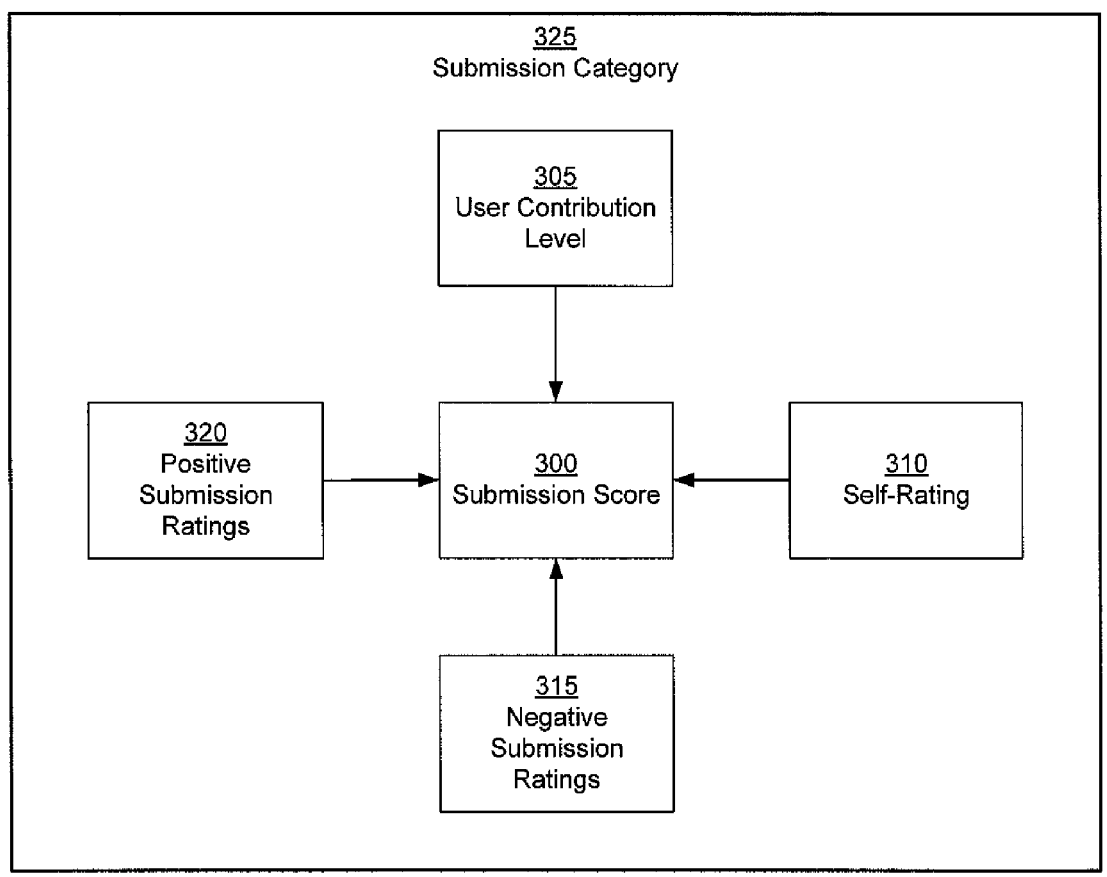
FIG. 3 shows a submission rating system in accordance with one or more embodiments of the invention.

FIG. 3 shows a submission rating system in accordance with one or more embodiments of the invention. As shown in FIG. 3, the submission score (300) is influenced by several factors, including the user contribution level (305), self-rating (310), negative submission ratings (315), and positive submission ratings (320). The factors may also be obtained within the context of the submission category (325), as explained previously. As described above, the user contribution level (305) is based on the number and/or frequency of other submissions in the submission category (325), and the self-rating (310) refers to the user's opinion of his/her qualifications and/or expertise in the submission category (325).

In the submission rating system of FIG. 3, submission ratings are divided into negative submission ratings (315) and positive submission ratings (320). The negative submission ratings (315) and positive submission ratings (320) may be determined based on the scale used in obtaining the submission ratings. For example, if users choose between "agree" and "disagree", positive submission ratings (320) are those in which "agree" is chosen and negative submission ratings (315) are those in which "disagree" is chosen. If submission ratings are obtained on a scale of 1 to 10, positive submission ratings (320) may be the ratings above 5 or 6 and negative submission ratings (315) may be the ratings below 5 or 6. Patterns of submission ratings for other submissions may also be examined to determine the difference between positive submission ratings (320) and negative submission ratings (315).

In one or more embodiments of the invention, the submission score (300) is affected more by a significant difference between the number of positive submission ratings (320) and the number of negative submission ratings (315) than by a minor difference between the number of positive submission ratings (320) and the number of negative submission ratings (315). For example, the submission score (300) for a submission with 200 positive submission ratings (320) and 20 negative submission ratings (315) may be affected more by the submission ratings than a submission with 50 positive submission ratings (320) and 45 negative submission ratings (315).

As mentioned previously, the factors (i.e., user contribution level (305), self-rating (310), negative submission ratings (315), and positive submission ratings (320)) may be associated with weights (not shown) that determine the affect of each factor on the submission score (300). The weights may then be applied to the factors to obtain a result, which may be scaled to obtain the submission score (300). In one or more embodiments of the invention, the negative submission ratings (315) and positive submission ratings (320) may be associated with separate factors. Further, in one or more embodiments of the inventions, the negative submission ratings (315) and positive submission ratings (320) may be combined using one or more statistical and/or numerical methods and applied to the submission score (300) using a single weight.

Figure 4:
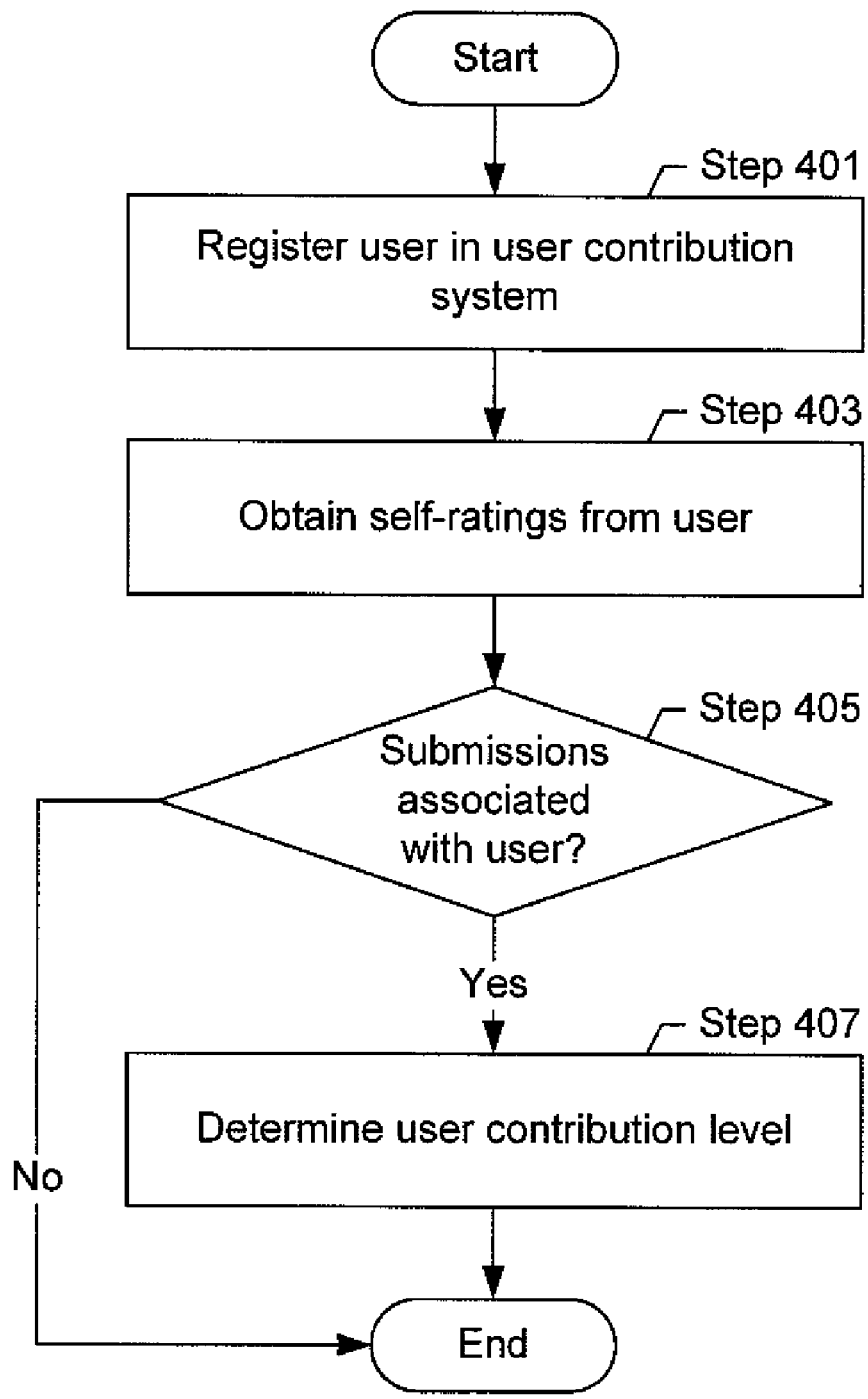
FIGS. 4-5 show flow diagrams in accordance with one or more embodiments of the invention.
Figure 5:
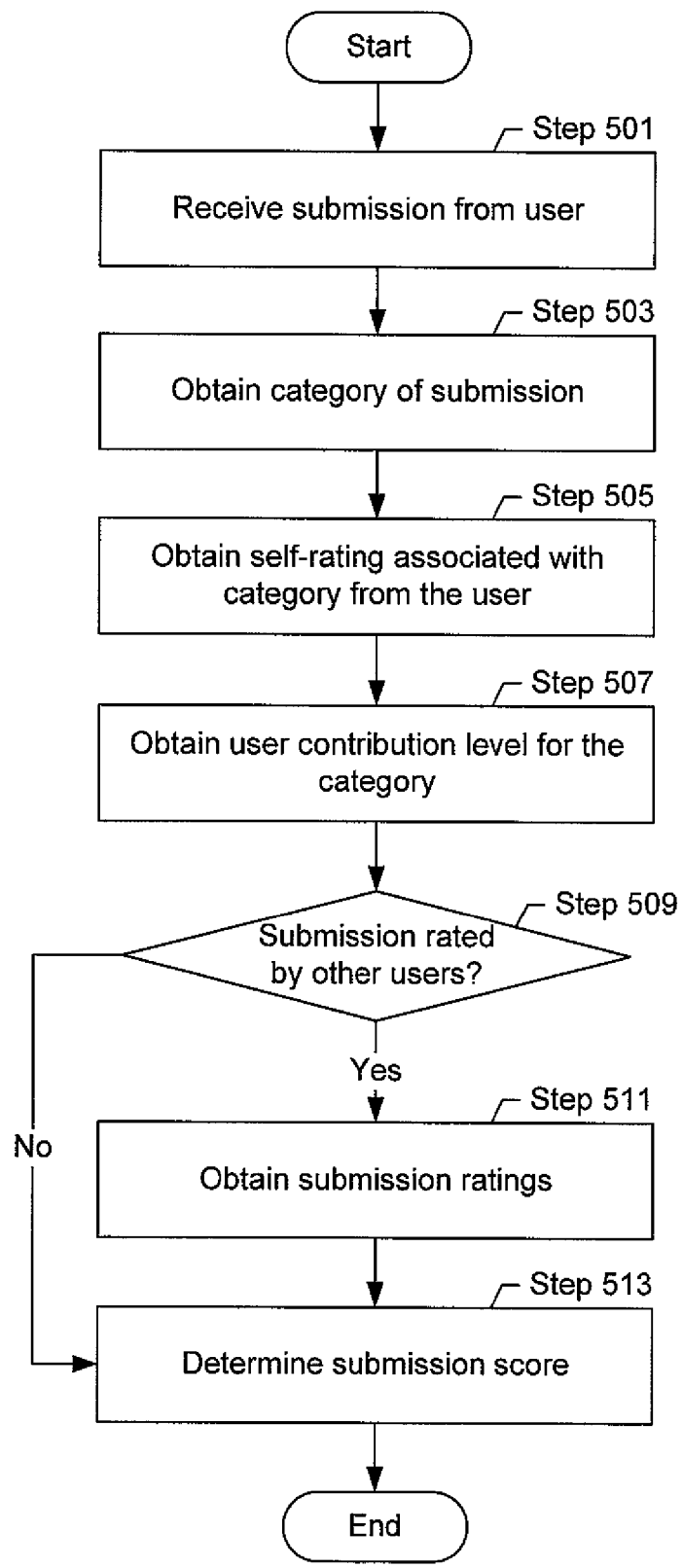

FIGS. 4 and 5 show flow diagrams in accordance with one or more embodiments of the invention. In one or more embodiments of the invention, one or more of the steps described below may be omitted, repeated, and/or performed in a different order. Further, one or more of the steps may be performed concurrently with other steps. Accordingly, the specific arrangement of steps shown in FIGS. 4 and 5 should not be construed as limiting the scope of the invention.

FIG. 4 shows a flow diagram of self-rating in a contribution system in accordance with one or more embodiments of the invention. Initially, a user is registered in a user contribution system (Step 401) such as the user contribution system of FIG. 1. Registration may include obtaining user information, such as a login, password, name, address, and/or email address, and creating a user account with the user information. Self-ratings are also obtained from the user (Step 403). As described above, the self-ratings represent the user's opinion of his/her knowledge and/or expertise in one or more categories associated with the user contribution system. Further, the self-ratings may be used to determine a submission score for submissions made by the user.

A determination is made regarding whether submissions are associated with the user (Step 405). The submissions may be provided by the user, imported from another user contribution system, and/or obtained using another method. For example, a user registering on a photo sharing application may import pictures from his/her user account on another photo sharing application instead of uploading the pictures from a personal computer. If submissions are associated with the user, a user contribution level is determined (Step 407) for each of the categories containing submissions from the user. As stated above, the user contribution level may be based on an absolute or relative number and/or frequency of submissions in a category by the user.

FIG. 5 shows a flow diagram of submission rating in a user contribution system in accordance with one or more embodiments of the invention. Initially, a submission is received from a user (Step 501). As described above, the submission may include one or more digital formats. In addition, the submission may be associated with one of a variety of purposes, such as sharing media, asking a question, answering a question, and/or providing an opinion and/or review. A category associated with the submission is also obtained (Step 503). The category may be based on the nature of the submission, as described above. Further, the category may be provided by the user, provided by an administrator, and/or assigned to the submission after algorithmically analyzing (e.g., word matching, image processing, or speech recognition) the content of the submission.

A self-rating associated with the category is obtained from the user (Step 505). As mentioned previously, the self-rating is a personal measure of the user's level of expertise, experience, and/or understanding of the category. A user contribution level is also obtained for the user in the category (Step 507). The user contribution level may be based on an absolute or relative measure of the number and/or frequency of submissions by the user in the category.

If submission ratings exist for the submission (Step 509), the submission ratings are obtained (Step 511) and a submission score is obtained (Step 513) using the self-rating, user contribution level, and submission ratings. Otherwise, if the submission is new and/or other users have not read and/or rated the submission, the submission score is obtained (Step 513) using the self-rating and user contribution level. As stated above, the submission score may be obtained by applying a number of scoring weights to the factors and scaling the result. Additionally, the submission score may be used to filter the submission, block the submission and/or the user, and/or recognize the submission and/or the user.

Figure 6:
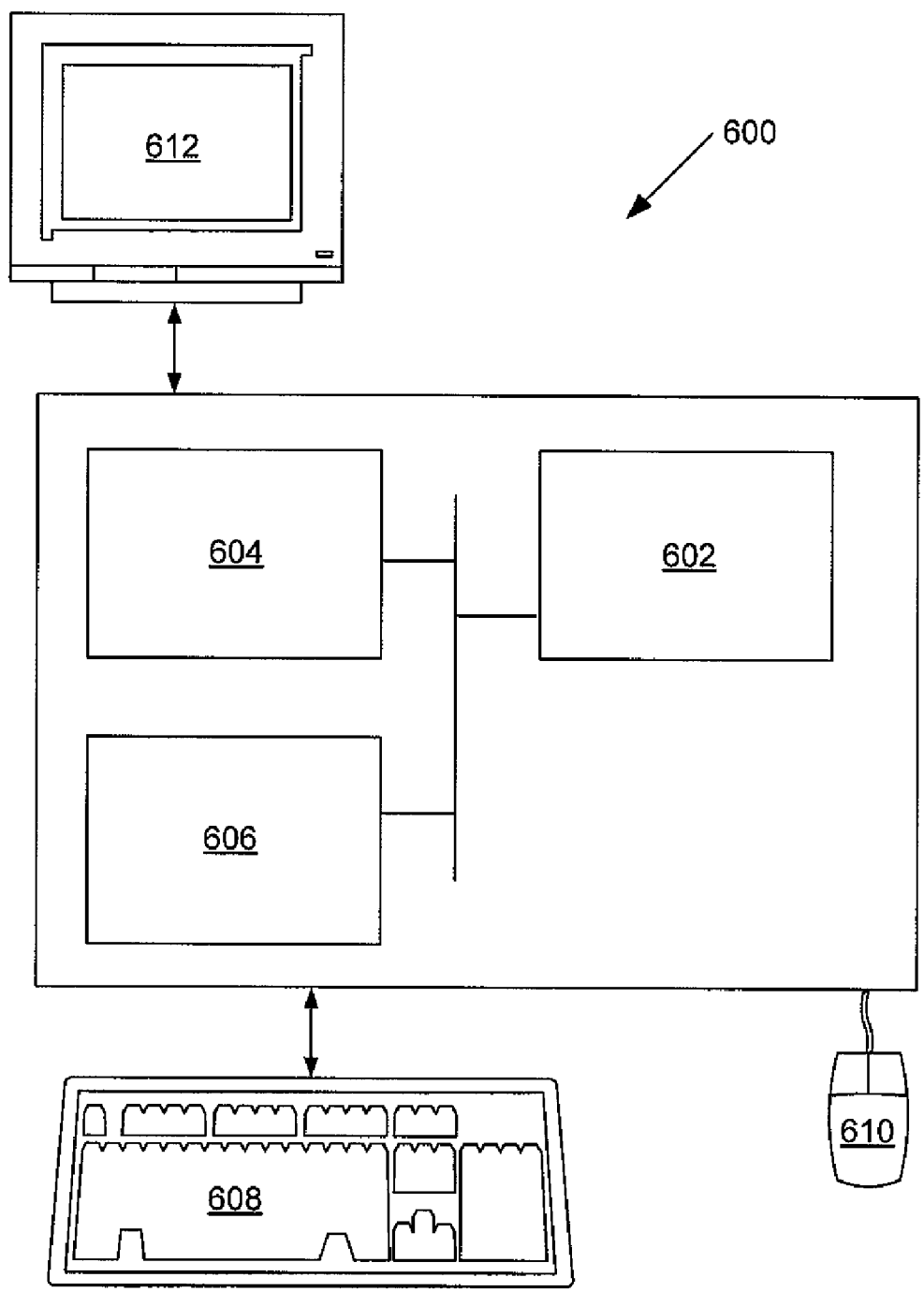
FIG. 6 shows a computer system in accordance with one or more embodiments of the invention.

Embodiments of the invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., submission rating module, scoring module, categorization module, user rating module, submission repository, and submission repository) may be located on a different node within the distributed system. In one or more embodiments of the invention, the node is a computer system. In one or more embodiments, the node may be a processor with associated physical memory. The node may also be a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for rating a submission within a user contribution system, comprising:

receiving, by the user contribution system executing on a computer processor, the submission from a first user, wherein the submission is associated with a specified category;

obtaining, by the user contribution system, a self-rating from the first user, wherein the self-rating comprises a level of expertise of the first user for the specified category;

calculating, by the user contribution system, a user contribution level associated with the specified category, wherein the user contribution level comprises a frequency of submissions by the first user in the specified category;

receiving, by the user contribution system, a positive submission rating from a second user, wherein the positive submission rating indicates the second user's opinion of the submission;

receiving, by the user contribution system, a negative submission rating from a third user, wherein the negative submission rating indicates the third user's opinion of the submission;

determining, by the user contribution system, a submission score for the submission based on the self-rating, the positive submission rating, the negative submission rating, and the user contribution level;

storing, by the user contribution system, the submission and the submission score in a submission repository comprising a plurality of submissions and a plurality of submission scores, wherein each of the plurality of submissions is associated with at least one category;

receiving, by the user contribution system, a query from a fourth user, wherein the query requests submissions associated with the specified category;

selecting, by the user contribution system in response to the query, the submission from the plurality of submissions associated with the specified category, wherein the submission is selected based on the submission score; and presenting, by the user contribution system, the submission to the fourth user in response to selecting the submission.

2. The method of claim 1, further comprising:

receiving, by the user contribution system, a subsequent negative submission rating for the submission from a fifth user; and updating the submission score based on the subsequent negative submission rating.

3. The method of claim 2, further comprising:

blocking the first user based on the submission score.

4. The method of claim 2, further comprising:

recognizing the first user based on the updated submission score.

5. The method of claim 1, wherein determining the submission score further comprises:
using at least one scoring weight and a scoring scale.

6. The method of claim 1, further comprising:
filtering the submission based on the submission score.

7. The method of claim 1, wherein the specified category is determined using word matching on the submission.

8. The method of claim 1, wherein the specified category is received from the first user.

9. A user contribution system for managing a submission from a first user, comprising:
a processor;
a user rating module executing on the processor and configured to:
receive, from the first user, the submission, wherein the submission is associated with a specified category;
obtain, from the first user, a self-rating comprising a level of expertise of the first user for the specified category;
a submission rating module executing on the processor and configured to:
receive, by the user contribution system, a positive submission rating from a second user, wherein the positive submission rating indicates the second user's opinion of the submission;
receive, by the user contribution system, a negative submission rating from a third user, wherein the negative submission rating indicates the third user's opinion of the submission;
a scoring module executing on the processor and configured to:
calculate a user contribution level for the first user based on a frequency of submissions by the first user to the specified category; and
determine a submission score for the submission based on the self-rating, the positive submission rating, the negative submission rating, and the user contribution level;
a submission repository comprising a plurality of submissions from a plurality of users; and
a forum executing on the processor configured to:
receive a query from a fourth user, wherein the query requests submissions associated with the specified category;
select, in response to the query, the submission from the plurality of submissions associated with the specified category, wherein the submission is selected based on the submission score; and
present the submission to the fourth user in response to selecting the submission.

10. The user contribution system of claim 9,
wherein the submission rating module is further configured to receive a subsequent negative submission rating for the submission from a fifth user, and
wherein the scoring module is further configured to update the submission score based on the subsequent negative submission rating.

11. The user contribution system of claim 9, wherein the scoring module is further configured to block the first user based on the submission score.

12. The user contribution system of claim 9, wherein the scoring module is further configured to recognize the first user based on the submission score.

13. The user contribution system of claim 9, wherein the scoring module is further configured to use at least one scoring weight and a scoring scale to determine the submission score.

14. The user contribution system of claim 9, wherein the submission is filtered based on the submission score.

15. The user contribution system of claim 9, wherein the specified category is provided by the first user.

16. The user contribution system of claim 9, further comprising:
a categorization module configured to determine the specified category from content of the submission.

17. A computer readable storage medium comprising computer program code to rate a submission under control of a processor, the computer program code comprising instructions to:
receive, by the user contribution system executing on a computer processor, the submission from a first user, wherein the submission is associated with a specified category;
obtain, by the user contribution system, a self-rating from the first user, wherein the self-rating comprises a level of expertise of the first user for the specified category;
calculate, by the user contribution system, a user contribution level associated with the specified category, wherein the user contribution level comprises a frequency of submissions by the first user in the specified category;
receive, by the user contribution system, a positive submission rating from a second user, wherein the positive submission rating indicates the second user's opinion of the submission;
receive, by the user contribution system, a negative submission rating from a third user, wherein the negative submission rating indicates the third user's opinion of the submission;
determine, by the user contribution system, a submission score for the submission based on the self-rating, the positive submission rating, the negative submission rating, and the user contribution level;
store, by the user contribution system, the submission and the submission score in a submission repository comprising a plurality of submissions and a plurality of submission scores, wherein each of the plurality of submissions is associated with at least one category;
receive, by the user contribution system, a query from a fourth user, wherein the query requests submissions associated with the specified category;
select, by the user contribution system in response to the query, the submission from the plurality of submissions associated with the specified category, wherein the submission is selected based on the submission score; and
present, by the user contribution system, the submission to the fourth user in response to selecting the submission.

18. The computer readable medium of claim 17, wherein the computer program code further comprises instructions to:
receive, by the user contribution system, a subsequent negative submission rating associated with the submission from as fifth user; and
update the submission score based on the subsequent negative submission rating.

19. The computer readable medium of claim 17, wherein the instructions to determine the submission score further comprise instructions to use at least one scoring weight and a scoring scale.

20. The computer readable medium of claim 17, wherein the computer program code further comprises instructions to filter the submission based on the submission score.

21. The computer readable medium of claim 17, wherein the specified category is determined using word matching on the submission.

22. The computer readable medium of claim 17, wherein the specified category is received from the first user.

* * * * *